(12) United States Patent
Gerpheide

(10) Patent No.: US 6,473,069 B1
(45) Date of Patent: *Oct. 29, 2002

(54) APPARATUS AND METHOD FOR TACTILE FEEDBACK FROM INPUT DEVICE

(75) Inventor: George E. Gerpheide, Salt Lake City, UT (US)

(73) Assignee: Cirque Corporation, Salt Lake City, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1260 days.

(21) Appl. No.: 08/556,614

(22) Filed: Nov. 13, 1995

(51) Int. Cl.$^7$ ................................................ G09G 5/08
(52) U.S. Cl. ........................ 345/157; 345/173; 341/27; 341/34
(58) Field of Search ............ 340/825.19; 341/20–23.27, 341/34; 345/168, 169, 156, 160, 157, 104, 145, 163, 173, 174; 178/18, 19, 18.01–18.11, 19.01–19.07; 273/148 B; D14/106, 114; 463/37

(56) References Cited

U.S. PATENT DOCUMENTS

| | | | | |
|---|---|---|---|---|
| 5,231,380 A | * | 7/1993 | Logan .......................... | 345/156 |
| 5,327,161 A | * | 7/1994 | Logan et al. ................ | 345/157 |
| 5,410,333 A | * | 4/1995 | Conway ...................... | 345/168 |
| 5,469,194 A | * | 11/1995 | Clark .......................... | 345/173 |
| 5,493,654 A | * | 2/1996 | Gopher et al. ................ | 341/22 |
| 5,543,588 A | * | 8/1996 | Bisset et al. ................ | 345/173 |
| 5,557,299 A | * | 9/1996 | Maynard et al. ............ | 345/168 |

* cited by examiner

Primary Examiner—Lun-Yi Lao
(74) Attorney, Agent, or Firm—Morris, Bateman, O'Bryant & Compagni

(57) ABSTRACT

A method and apparatus for providing tactile feedback to a user moving his/her finger across the touch-sensitive surface of a touchpad or tablet. Different regions of the touch-sensitive surface are differentiated from each other by providing a different human perceptible textural surfaces within the regions. A different texture provides immediate tactile feedback to the user through the finger making contact with the touchpad. Increased functionality is important because it solves problems which are inherent to the small touchpad surfaces used as computer input devices. Particularly, it is a problem to drag an object from one side of a display to another without repeatedly raising a finger to repeat the dragging motion because of the limited surface area of the touchpad surface. Providing increased functionality such as a drag extend function solves the movement problem. The present invention then solves the problem of conveying to the user through touch, information about the location of the finger without having to look away from the display screen, thereby facilitating input and cursor manipulation for a computer. The apparatus of the present invention preferably includes an electronic touch-sensitive touchpad or tablet which can be actuated by a human finger, an associated processing device such as a computer, and a display screen whereon a cursor being manipulated by the touchpad is displayed.

16 Claims, 7 Drawing Sheets

APPARATUS AND METHOD FOR TACTILE FEEDBACK FROM INPUT DEVICE

BACKGROUND OF THE INVENTION

1. Field of the Invention

This invention pertains to computer input and pointing devices used to control cursor movement on a display. More particularly, this invention pertains to touch-sensitive data input and pointing devices for data input to computers and other devices which benefit from interaction with a user.

2. Prior Art

Input devices for computers are well known in the art. There are several types of input devices including the familiar "mouse." The mouse has become so popular because, when combined with a graphical user interface (GUI), it is so much easier to use than typed keyboard commands. Instead, a cursor is caused to move on a display screen, the cursor being controlled by movements of the mouse being translated into corresponding cursor movements. The mouse has been accepted as a "user friendly" input device for both experienced and novice computer users. The popularity which the mouse has achieved in the art can be given large credit for fostering the explosive growth of the personal computer industry since a mouse provides a simple means for users to input data to a computer.

While mice are currently the most popular non-keyboard input device, a mouse generally requires a free-rolling surface, i.e. a table top, on which it can operate. Disadvantageously, a mouse is not well suited for use in cramped spaces or with a portable computer, particularly laptop, notebook, sub-notebook, and palmtop computers. In answer to the long existing need for a more convenient input device suitable for both portable and desktop computers, various alternative input devices have been proposed. Such alternative input devices include devices commonly referred to as track balls, track pens, track point devices, as well as various devices which sense the position of a pointing object on a position sensing surface. The devices which sense the position of a pointing object on a sensing surface generally have the advantages of being simple to use, being easily integrated with current computers and other computing devices, reliability, ruggedness, compactness, and the ability to be transported and used in a variety of locations.

Numerous types of input devices utilize a position sensing surface. Examples are provided in the following patent references: U.S. Pat. No. 3,886,311, Rodgers et al. (Writing pen for detecting time varying electrostatic field produced by a writing tablet); U.S. Patent No. 4,672,154, to Rodgers et al. (Cordless stylus which emits a directional electric field from the tip of a conductive pen cartridge sensed by a digitizer tablet having an X-Y coordinate system); U.S. Pat. No. 4,680,430 to Yoshikawa et al. (A tablet-like coordinate detecting apparatus including a resistive film for determining the coordinate position data of a point on a plane indicated by the touch of a finger tip or other load); U.S. Pat. No. 4,103,252 to Bobick (A position sensing tablet with electrodes located on the boundaries of a sensing region which detects a human touch by the change in capacitive charge caused by the touch which varies the time constant of an RC network which is part of an oscillator); U.S. Pat. No. 4,736,191 to Matzke (A touch activated control device comprising individual conductive plates wherein a user's touch on the dielectric layer overlaying the plates is detected by individually charging and discharging each of the sectors in the plates in a sequential manner to determine the increased capacitance of the sector); U.S. Pat. No. 4,550,221 to Mabusth (A touch sensitive control device which translates touch location to output signals and which includes a substrate that supports first and second interleaved, closely spaced, non-overlapping conducting plates); U.S. Pat. No. 4,639,720 to Rympalski et al. (An electronic sketch pad which contains a graphics input pad having an array of transparent capacitive pixels, the capacitance characteristics of which are changed in response to the passing of a conductive tipped stylus over the surface of the pad); and, European Patent Publication No. 574,213 (A proximity sensor includes a sensor matrix array which senses changes in capacitance between horizontal and vertical conductors connected to the position sensing pad to determine x, y, & z position information).

A particularly useful and advantageous input device is disclosed in U.S. Pat. No. 5,305,017 to Gerpheide. The Gerpheide patent discloses devices and methods which overcome the drawbacks inherent in other devices which utilize a sensing tablet or sensing surface. The devices and methods of the Gerpheide patent include a touch sensitive input pad upon which a user conveniently inputs position information with a finger. In operation, the user's finger tip is brought in close proximity to the top surface of the position sensing surface of the touch sensitive pad. The device of the Gerpheide patent detects the position of the finger tip in the x and y directions of the touch pad as well as the finger's proximity in the z direction in relation to the sensing surface. In addition to a finger, the pointing object can be any other conductive object.

The above mentioned input devices are easily distinguished from each other by focusing on a particular characteristic which each device does or does not possess. Specifically, each input device may either be used by moving a stylus across the touchsensitive surface, or a human finger, or both. The input devices of interest are only those which are usable by touching the touch-sensitive surface with a finger.

The different input devices allow for various sensing apparatus of the touch-sensitive devices to detect the finger and translate movement of the finger into corresponding movement of a cursor on a display screen. This patent has within its scope of interest those touchpad-type devices which readily provide tactile feedback to the user, and which control a cursor on a display device. Practically speaking, the greatest feedback occurs when using touchpads and tablets operated by a user's finger.

One of the advantages of using a touchpad or tablet as an input device is that space is conserved. This means that the touchpad or tablet are not moved around, as is a mouse, in order to manipulate a cursor on a display screen. Instead, a finger is moved across a touch-sensitive surface, while the touchpad or tablet advantageously remains stationary. This characteristic is very important when space constraints are premium, such as on an airplane or a crowded desk.

With the advent of these new touchpad and tablet devices have also come enhancements to make them easier to use and to provide additional benefits over mice and other input devices. In particular, the Gerpheide patent application, Ser. No. 08/413,199, teaches a SYSTEM AND METHOD FOR EXTENDING THE DRAG FUNCTION OF A COMPUTER POINTING DEVICE. This patent application is particularly useful to touchpads and tablets because it makes optimum use of the available touchpad surface area. When a cursor is manipulated to drag an object across a display screen, typically the user cannot complete the operation in a single continuous stroke of a finger. The reason is that although it is common practice to make a small finger movement on a touchpad correspond to a larger cursor movement on a display by magnifying relative motion, available touchpad surface area is still finite. Therefore, in the middle of a drag operation during which the user is maintaining contact with a touchpad, the user is forced to lift the finger. In conventional computer input devices, lifting the finger terminates the drag operation. The user must reselect the object which was being dragged by the cursor, and then continue movement. Depending upon the distance to be moved, this operation might be repeated several times.

The Gerpheide patent advantageously provides new functionality to the touchpad by creating a delay in drag cancellation. Specifically, when dragging an object with a cursor, lifting the finger does not immediately result in termination of drag operation. Instead, a delay in termination provides sufficient time for a user to lift the finger, move it to a new location on the touchpad, and resume dragging the object as if the finger had never been lifted.

Implementation of the drag extend function described above is accomplished by creating regions on the touchpad surface which provide new functionality. For example, moving a finger into an appropriate region activates a desired function. With drag extend, the most logical location for a region which can activate the function is the perimeter of a touchpad. This is because the user's finger is going to reach the edge of the touchpad. By creating a border region around the entire touchpad perimeter, the drag extend function can be activated while dragging in any direction. It should be apparent from the explanation above that endowing a border region with extended functions such as drag extend can be advantageous for the user.

A problem which is not readily apparent from the description given above is that a user is not always aware of the location of their finger on the touchpad. A user is manipulating the position of a cursor on a display screen, and therefore is concentrating on watching the display and not the touchpad. The problem arises when a user wants to use, for example, the drag extend function. The surface of a touchpad is typically uniformly smooth to the perception of human touch. Typically, there is no tactile indication to assist a user in determining whether a finger is within the border region or not. Consequently, when the user executing the drag operation lifts the finger from the touchpad, the drag function might terminate. In essence, no way is readily provided for a user to know when a finger has entered the border region.

One attempt at a solution to this problem of inadequate tactile feedback is provided by Logan et al. in U.S. Pat. No. 5,327,161. Generally, the Logan patent apparently addresses the issues of replacing an ordinary mouse with a touchpad type device. Specifically, the patent teaches providing extended functionality to a touchpad by placing touch-sensitive sensor strips on a physically raised outer perimeter or bevel around the touchpad, but not actually on the touchpad surface. When a finger comes in contact with the touch-sensitive strips, extended functionality is provided to the user.

One of the several disadvantages of the Logan patent is that construction of the touchpad is needlessly complicated. Specifically, Logan requires a raised bevelled edge to be created around the touchpad perimeter to provide the physical tactile feedback to the user that an edge of the touchpad has been reached. The touch-sensitive strips are formed independent of the touchpad material, and they require additional circuitry, sensors, and a coordinating processor to determine when the touchpad surface and the touch-sensitive strips are being activated simultaneously.

Another disadvantage is that Logan does not teach how nearing the perimeter of the touchpad can be useful. Instead, Logan only provides tactile feedback when the user actually strikes the bevelled edges of the touchpad. The user is given no tactile warning that an edge is approaching. Illustrated in FIG. 1 as a representation of a computer system 16 to which is attached a mouse 10 through interface 18, wherein the mouse acts as a cursor locator input device. The movement of the mouse 10 is translated into movement of a cursor on a display 20 coupled to the computer 16 in real time. In many cases, it is desirable that any input device to be used with the computer 16 be compatible therewith. Alternatively, a cursor locating device can interface directly with the computer 16, for example via an operating system or some other technique which does not require a mouse driver.

In order to be compatible with the computer 16, any input device must provide "click", "drag" and "gesture" functions which can also be provided by the mouse 10. The click function entails depressing and releasing one of the mouse buttons 12 or 14. The click function may entail single, double, triple or even half clicks. For example, a one and a half click is where the user uses a finger to press down on a button or surface, raises the finger to release, then presses down and holds the button or surface with the finger again. The drag function entails moving the cursor over text or an object on the display 20, depressing a mouse button 12 or 14, keeping the mouse button depressed while "dragging" the text or object to a new location on the display 20, and releasing the mouse button to position the text or object on the new location on the display 20. Finally, gestures are symbols or other figures created by tracing alphanumeric characters on the touchpad.

Also represented in FIG. 1 is a touch-sensitive positioning device, generally referred to at 26, which includes a position sensing surface 22 and a pointing object 24. Early versions of these touch-sensitive touch-pad type devices included mechanical buttons, such as those shown at 28 and 30 which provide the functions of mouse buttons 12 and 14, respectively.

However, advancements have made it possible to have a touch 15 sensitive device which no longer requires mechanical switch buttons to carry out the click function. Instead, the touchsensitive devices require a user to simply lift a finger and tap once, twice, three times or with half-taps on the touch-sensitive surface. The tapping motion is detectable by the touch-sensitive circuitry which informs the driver or application software of the input action.

FIG. 2A is a schematic side elevational view of a touchpad input device 40 illustrating a touch-sensitive bezel 42 of the system taught in U.S. Pat. No. 5,327,161 by Logan et al. Logan has significant disadvantages which are overcome by the present invention. However, to understand the improvements, it is necessary to have a little background in order to illustrate them.

As shown, the touch-sensitive surface is recessed 44 down into a touchpad 40. At the borders of the touchpad 40 are four beveled edges 42 to which is attached a piezoelectric or some similar sensor device 46. When a user's finger presses against the beveled surface 42, the attached sensor 46 registers the contact and signals activation of a computer input function. This view also shows the mechanical switch 48 below the touch-sensitive touchpad 40 which is activated by pressure on the surface 50 above. The touch-sensitive surface 50 has no other features, other than a dotted line 52 shown in FIG. 2B.

FIG. 2B is a top view of the touchpad 40 shown in FIG. 2A. The notable feature is the dotted line 52 defining a perimeter of the touchpad surface 50 already mentioned. With this complete view, an illustration of what Logan describes as continued cursor movement can now be explained.

The beveled edges 42, or alternatively the dotted line 52, can indicate to the user when continued cursor movement is activated. This occurs in Logan when a finger presses down on the touchpad surface 50 within the dotted line 52, selects an object on a display screen, and closes the mechanical switch 48. When the user moves the finger to an edge 42 until it touches, or alternatively crosses the dotted line 52, the continued cursor movement mode is activated, and the cursor continues to move in the same direction it was originally moving until the finger is removed from the beveled edge 42 or lifted from the touchpad surface 50.

The method and apparatus has several shortcomings, some of which are described below. First, the touchpad 40 uses a mechanical switch 48 to indicate that a drag function is being activated. A mechanical switch 48 is inherently prone to failure because the physical components can become contaminated and the switch may fail due to wear.

Second, there is no warning to the user that a finger is approaching an edge 42 of the touchpad 40. Consequently, the user may not wish to activate the continued cursor movement mode, but may do so inadvertently.

Third, the sensors 46 on the beveled edges 42 are not part of the touchpad sensor array. Therefore they require additional circuitry to decode signals received therefrom.

Fourth, the dotted line 52 around the perimeter of the touchpad surface 50 is only a visual indicator for where the continued cursor movement mode begins. The user is thus required to view the touchpad 40 anytime confirmation is required of the present location of the finger on the touchpad surface 50. This slows down a user of the touchpad 40.

The drawbacks of Logan et al. include insufficient tactile feedback indicating when a special function has been activated. They also include the additional circuitry which is required in a system which does not integrate sensing of movement into a perimeter of the touch pad with the already available touchpad circuitry.

Thus, it would be an advance in the art to provide a touch-sensitive finger actuable touchpad or tablet which provides tactile feedback to the user who is manipulating a cursor on a display screen, when a finger has passed into a special functions region of the surface, and without requiring additional circuitry or modification to existing designs.

OBJECTS AND SUMMARY OF THE INVENTION

In view of the above described state of the art, the present invention seeks to realize the following objects and advantages.

It is a primary object of the present invention to provide a method and apparatus for providing tactile feedback for an electronic touch-sensitive computer input and cursor manipulation device.

It is another object of this invention to provide a method and apparatus for providing tactile feedback for electronic touch-sensitive computer input devices which is particularly adapted for use with a touch-sensitive touchpad or tablet type computer input and pointing devices.

It is yet another object of this invention to provide a method and apparatus for providing tactile feedback for electronic touch-sensitive computer input devices which can operate with a user's finger as the only pointing object.

It is still a further object to provide a method and apparatus for providing tactile warning to a user that a finger moving on the touchpad surface is approaching an edge, but before reaching the edge.

These and other objects are realized in a method and apparatus for providing a tactile feedback response to a user moving their finger across the touch-sensitive surface of a touchpad or tablet. Different regions of the touch-sensitive surface are differentiated from each other by providing a different human perceptible textural surfaces within the regions. A different texture provides immediate tactile feedback to the user through the finger making contact with the touchpad. Increased functionality is important because it solves problems which are inherent to the small touchpad surfaces used as computer input devices. Particularly, it is a problem to drag an object from one side of a display to another without repeatedly raising a finger to repeat the dragging motion because of the limited surface area of the touchpad surface. Providing increased functionality such as a drag extend function solves the movement problem. The present invention then solves the problem of conveying to the user through touch, information about the location of the finger without having to look away from the display screen, thereby facilitating input and cursor manipulation for a computer. The apparatus of the present invention preferably includes an electronic touch-sensitive touchpad or tablet which can be actuated by a human finger, an associated processing device such as a computer, and a display screen whereon a cursor being manipulated by the touchpad is displayed.

The method of the present invention includes the step of creating a touchpad having regions of different textures. This is accomplished by either manufacturing the touchpad surface with the different textures, or adhering differently textured materials to the touchpad surface after manufacture. It is also conceivable that the different regions could be manufactured separately, and then mounted together such that there is a generally continuous touchpad surface over which the user's finger can slide. However, this approach is prohibitively more expensive and unnecessary.

These and other objects, features, advantages and alternative aspects of the present invention will become apparent to those skilled in the art from a consideration of the following detailed description taken in combination with the accompanying drawings.

DETAILED DESCRIPTION OF THE INVENTION

In order to better appreciate how the above-recited and other advantages and objects of the invention are obtained, reference will now be made to the drawings in which the various elements of the present invention will be given numerical designations and in which the invention will be discussed so as to enable one skilled in the art to make and use the invention.

Figure 1:
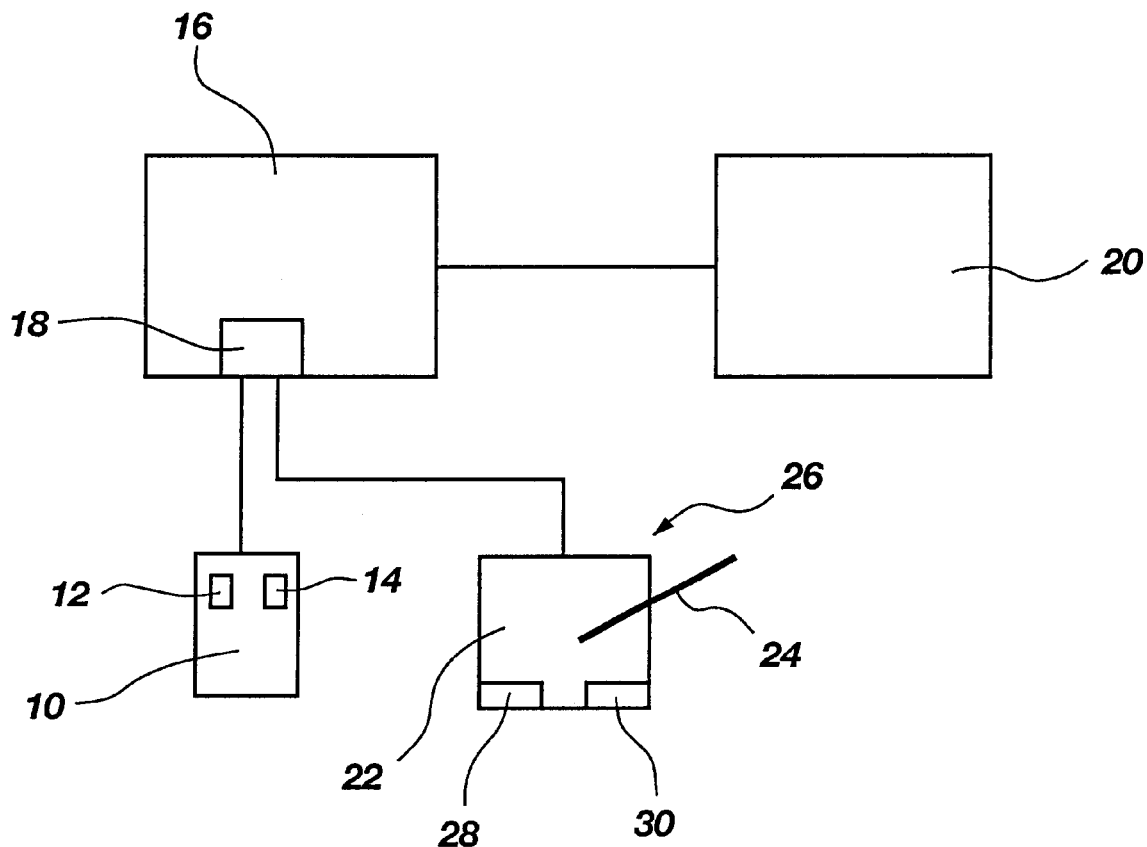
FIG. 1 is a block diagram of computer system having as input devices a mouse and a touchpad.
Figure 2A:
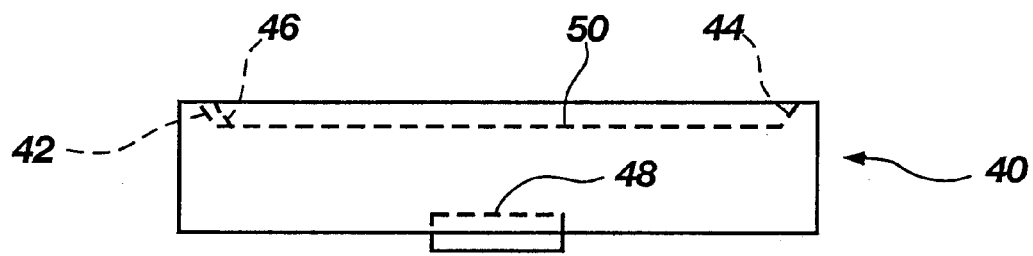
FIG. 2A is a side elevational view representing the prior art in touchpad surfaces which attempt to provide tactile feedback to the user.
Figure 2B:
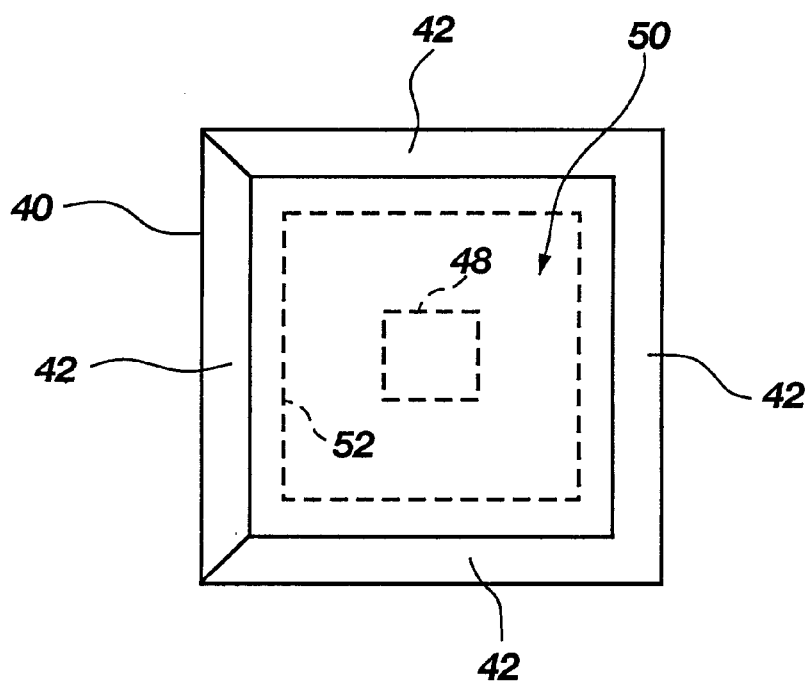
FIG. 2B is a top view of the touchpad device shown in FIG. 2A.
Figure 3:
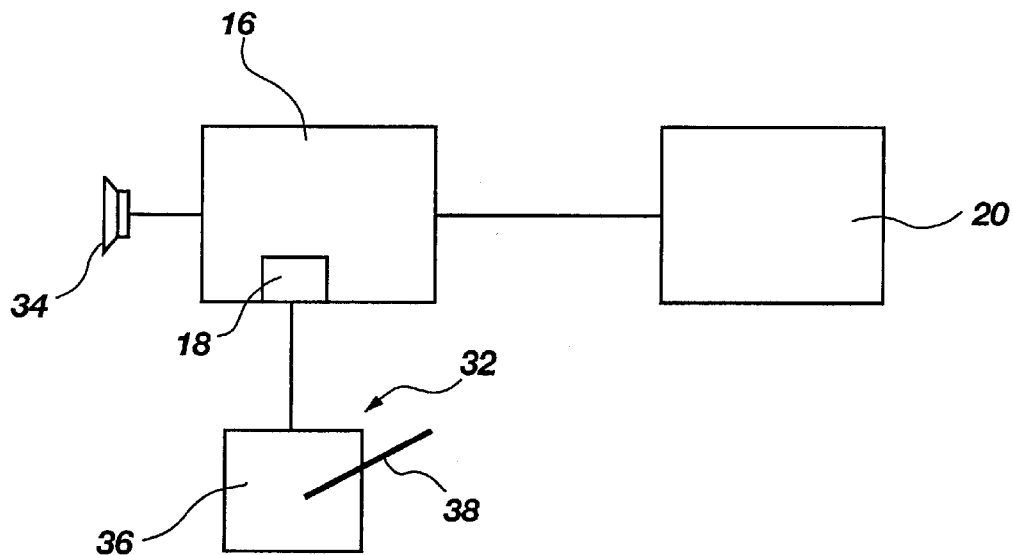
FIG. 3 is a block diagram of a computer system having as an input device a touchpad with a non-mechanical electronic switch.

FIG. 3 is a block diagram which shows the system of FIG. 1, but with two important changes. The mouse 10 has been removed, and the touch-sensitive device 26 is now replaced with a touch-pad 32 with no buttons. While a stylus can be used with touchpads, the present invention requires the enhanced tactile response which human fingers provide over a stylus. The touch pad has a position sensing surface 36 which senses the position of a pointing object, such as a user's finger, which is manipulated by the user.

It is particularly preferred that the touch sensitive pointing device which is described in U.S. Pat. No. 5,305,017 be used with the present invention. The touch sensitive pointing device described in U.S. Pat. No. 5,305,017 is particularly advantageous in that the cursor positioning, clicking, and dragging functions can all be accurately carried out by a user using only a single finger as a pointing object. Other advantages of the touch sensitive pointing device described in U.S. Pat. No. 5,305,017 are described therein or will be apparent from use of the invention. U.S. Pat. No. 5,305,017 is now incorporated herein by reference in its entirety. Using the information set forth in U.S. Pat. No. 5,305,017, U.S. patent application No. 08/413,199, and the information set forth herein, a system for carrying out the present invention can be readily arrived at by those skilled in the art. Importantly, the present invention is readily adaptable for use with numerous other pointing devices which can use a finger as the pointing device.

The touch-sensitive pointing device of the present invention is connected to the computer 16. The computer 16 is connected to a display 20 upon which various text and other objects are displayed and a cursor is located.

Figure 4A:
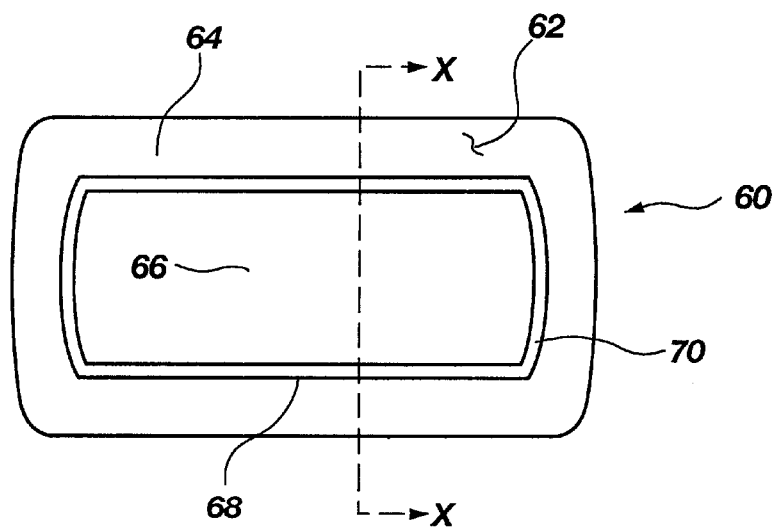
FIG. 4A is a top view of a touchpad touch-sensitive device made in accordance with the principles of the present invention.

FIG. 4A is a top view of a touchpad 60 made in accordance with the principles of the present invention in a preferred embodiment. The touchpad 60 has a generally planar touch-sensitive planar surface 62. However, in the preferred embodiment, the touchpad surface 62 is divided into two regions. The border region 64 is defined as the area which makes a continuous loop around the perimeter of the surface 62. The inner region 66 is defined as the area of the surface which lies within the border region 64. It should be realized that although two regions are created in a preferred embodiment, a plurality of regions can exist. The regions become useful if they are distinguishable by touch.

The regions should be considered to have a sharp boundary 68 which does not allow overlap. In this way, the regions 64, 66 can be separated by a ridge 70 which runs along a boundary 69 between the regions 64, 66 in a preferred embodiment. More specifically, a thin material 70, but easily discernible to the touch, is slightly raised above 't he generally planar surface 62. This feature is shown in the side elevational view of FIG. 3B.

Figure 4B:
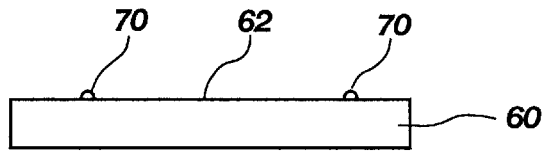
FIG. 4B is a side elevational view of the touchpad touch both sensitive device of FIG. 4A.

FIG. 4B shows in a cut-away view that a ridge material 70 rises above the touchpad surface 62 along the lines X—X. Those skilled in the art will appreciate that the ridge material 70 can be pressed at the time of manufacture of the touchpad 60, or it can be applied to the touchpad surface 62 after said generally planar surface has been formed.

Figure 4C:
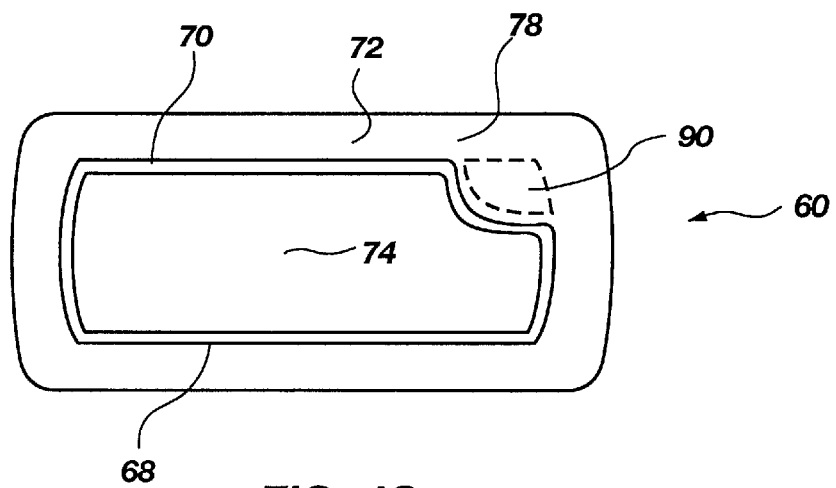
FIG. 4C is a top view of a touchpad touch-sensitive made in accordance with an alternate embodiment of the present invention.
Figure 4D:
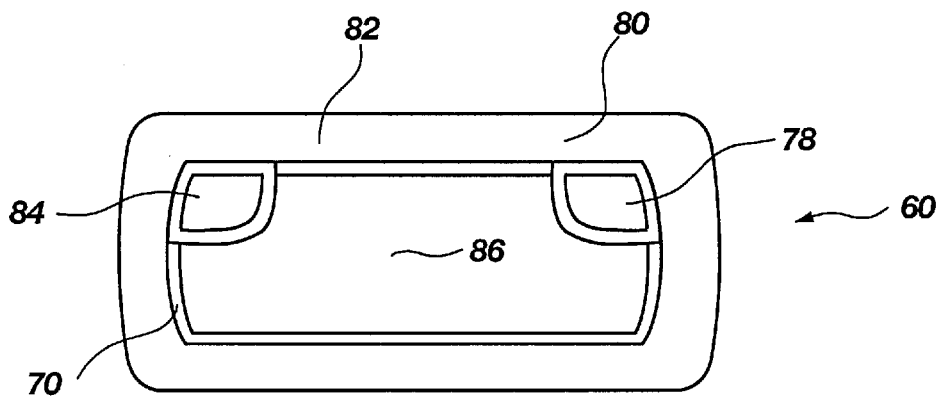
FIG. 4D is a top view of another alternative embodiment for a layout of a touchpad surface.

FIGS. 4C and 4D are all alternative touchpad surfaces 78, 80 with the ridged material defining a plurality of different shaped regions 64, 66. These regions 72, 74 define at least two different computer input and cursor manipulation functions. Therefore, it is possible but not required that different regions share the same functions, or that each region has a different function. FIG. 4C shows a touch-sensitive surface 78 of a touchpad 60 with a small area 90 of what was the inner region 66 in FIG. 4A now becoming part of the border region 72. This still means that the ridged material still defines the boundary 68 between regions. It is only the size of the regions which has been altered.

FIG. 4D shows a different alternative embodiment for a layout of the touchpad surface 80. Specifically, two separate regions 84, 88 are created within the inner region 86. These two regions 84, 88 function so as to emulate right and left mouse buttons such as those shown in FIG. 1.

Figure 5A:
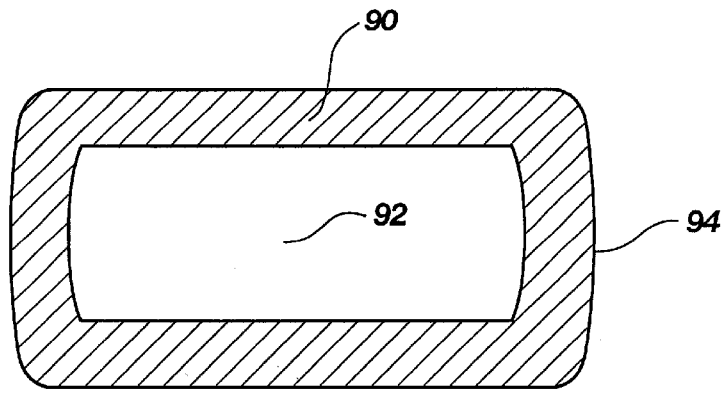
FIG. 5A is an alternative embodiment of a touch-sensitive surface which provides tactile feedback.

FIG. 5A is another alternative embodiment of the present invention which differs from FIG. 4 in the method of implementing tactile feedback to the user of a location of the finger on the touchpad surface, without having to glance at the touchpad. Specifically, the embodiment envisions implementing a human perceptible textured surface on the touch-sensitive surface.

To create the desired tactile response for the user, different regions 90, 92 have differently textured surfaces. Typically, touchpad surfaces are manufactured with a generally uniformly smooth surface. FIG. 5A illustrates a top view of a touchpad 94 having a border region 90 similar in shape to the border region 64 in FIG. 4A, but with a relatively heavily textured surface compared to the inner region 92. Those skilled in the art will appreciate that texturing the border region 90 is easily accomplished during manufacture of the touchpad surface by using a die or other technique to press the textured surface. Alternatively, the textured surface might be applied to the border region 90 after manufacture.

Figure 5B:
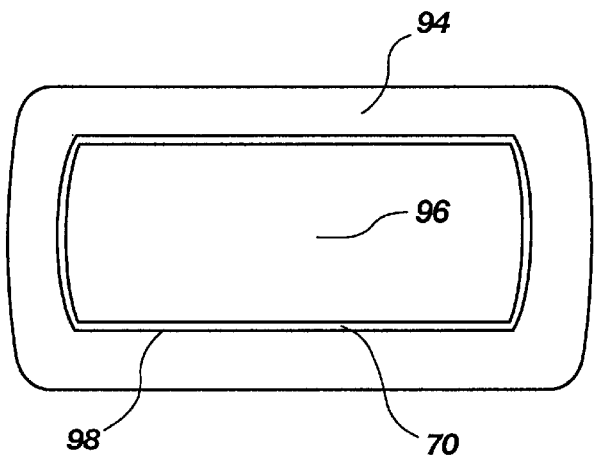
FIG. 5B is a modification of FIG. 5A.

FIG. 5B illustrates the same top view as shown in FIG. 5A, but modifies the embodiment by adding to the touchpad surface the ridged material of FIG. 4A along the boundary between different regions 94, 96.

Figure 5C:
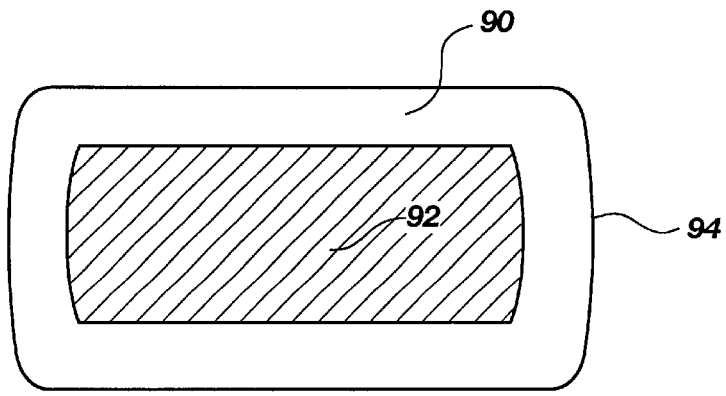
FIG. 5C is a modification of FIG. 5A.

FIG. 5C illustrates the same top view as shown in FIG. 5A, but with the relatively textured border region 90 now being smooth, and the relatively smooth inner region 92 now being textured.

So as to illustrate some of the most advantageous benefits of the present invention, a comparison of the Logan et al. Drawbacks previously listed will now be compared to the present invention so as to understand why the method and apparatus is improved.

First, instead of a mechanical switch to indicate when a function is being activated, the present invention employs a non-mechanical electronic switch. In this way, there are fewer components, and no mechanical components to wear out.

Second, because the border region is textured differently from the inner region, the user knows instantly that the finger is in close proximity to a touchpad edge, but not yet in contact.

Third, the touchpad of the present invention has no sensors other than those coupled to the generally planar surface. Therefore, complexity and cost of the present invention is kept lower than Logan et al.

Fourth, any visual indicator which might be included in the present invention might simply be to color the textured material or the ridge material. Any visual indicator is then useful for the times when occasional glances are made at the touchpad surface.

To further explain the benefits of the present invention, it is helpful to walk through the continued cursor movement mode of the prior art and compare it to the drag extend function which is incorporated by reference into this specification.

The present invention in a preferred embodiment provides a touch-sensitive input device surface having at least one generally planar sensor surface. The finger of the user slides over the surface to thereby manipulate a cursor on an associated computer controlled display. Disposed on the surface are a plurality of spaced-apart regions separated by a ridge of material which rises above the generally planar sensor surface. The user will begin the drag extend function by manipulating a cursor on the computer controlled display so as to select an object on the display while the user's finger is within an inner region such as inner region 66 in FIG. 4A. After selection, the user moves the finger to drag the selected object across the display. When the user's finger crosses the ridge of material 70, the drag extend function is accessed by the touchpad microcontroller, and activated. The user's finger can now stop and be raised off the surface 62 of the touchpad 60. Instead of the selected object being automatically deselected, a timer now begins to count. This countdown timer provides the user with time to move the finger back to the inner region 66 and place the finger on the touchpad surface 62. If the countdown timer has not expired, the user can continue to drag the selected object across the display. If the countdown timer has expired, the selected object is deselected, and the user must reselect the object in order to continue dragging it across the display.

Advantageously, the user was made aware that the finger could be safely lifted off the touchpad surface because the finger slipped up and over the ridge 70. The user was not required to actually look at the touchpad surface 66 in order to determine the location of the finger because of the tactile feedback provided by the ridge.

Figure 6A:
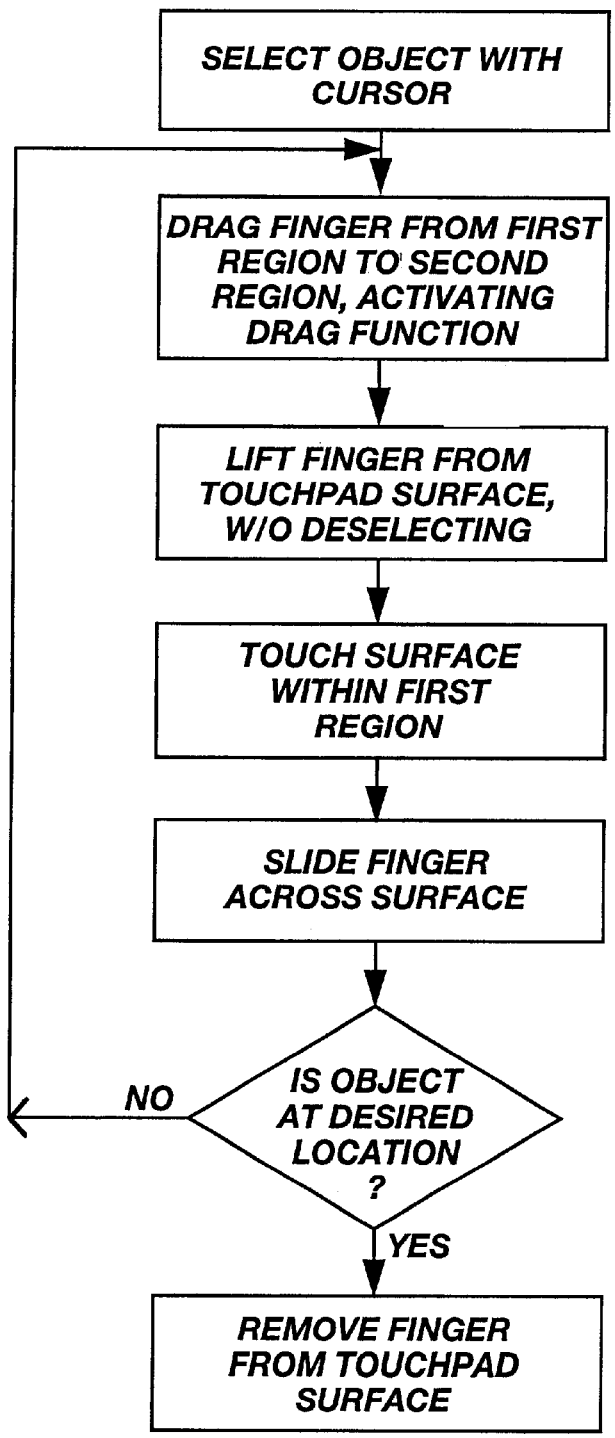
FIG. 6A is a flowchart of the presently preferred method of the present invention.
Figure 6B:
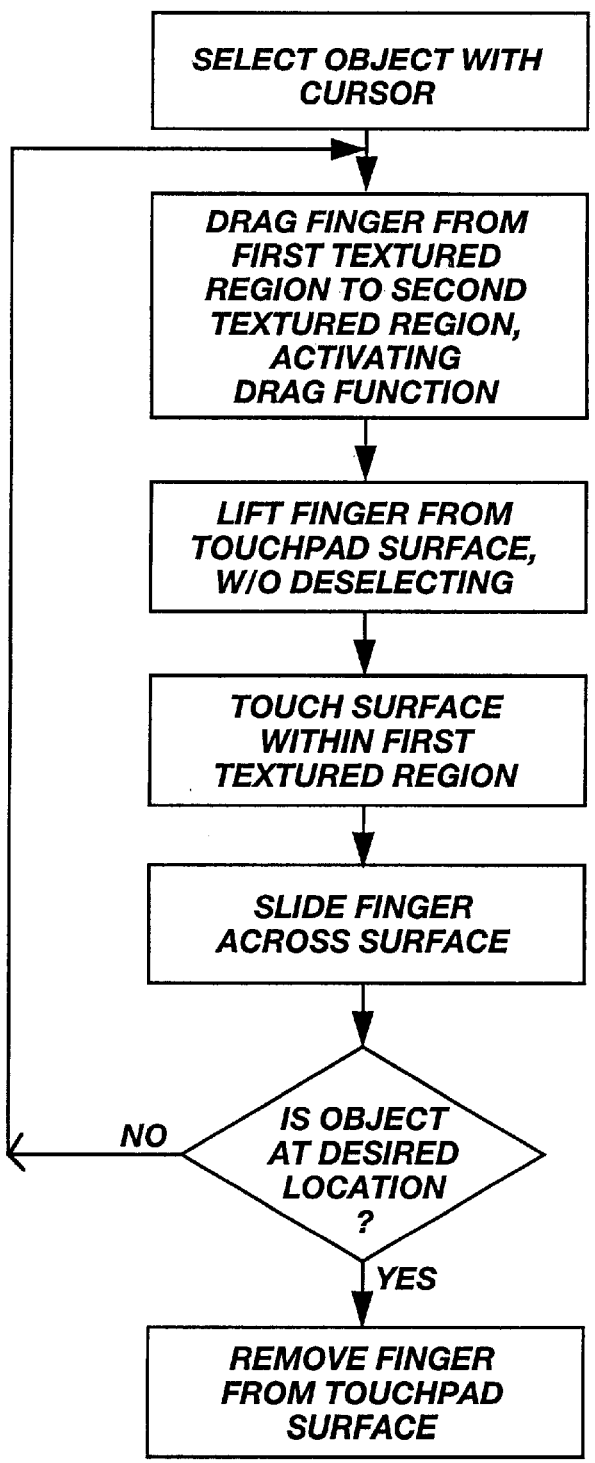
FIG. 6B is a flowchart of an alternative embodiment of the present invention.

FIGS. 6A and 6B are provided to show the presently preferred and an alternative embodiment of the method of operation of the drag function as described and claimed in the present invention. Specifically, FIG. 6A describes the method where the regions are separated by a ridge, whereas FIG. 6B describes the method where the regions have different textures.

In an alternative embodiment, the time in which the countdown timer takes to expire is user selectable so as to customize the computer input device to user requirements.

It is important to remember that the drag extend function is not the only function which the touchpad can implement. The drag extend function is simply provided as an example of the increased functionality offered by the present invention. The invention simply improves tactile feedback to make manipulation of a cursor on a computer controlled display easier for the user.

An alternative to the method described above is using one of the alternative touchpad surfaces as described in the other figures. The tactile feedback is provided by moving over regions whose surfaces are formed with different textures.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for providing human perceptible tactile differentiation to a human finger when using a continuous touch-sensitive cursor manipulation device of a computer controlled display, thereby enabling a user to manipulate a cursor on the display without viewing the cursor manipulation device and determining a location of the finger, the method comprising the steps of:
   (a) providing the touch-sensitive cursor manipulation device having at least one generally continuous and planar sensor surface for contact and movement thereover of the finger;
   (b) disposing on the generally continuous and planar sensor surface a plurality of spaced-apart regions separated by a ridge of material which rises above the generally continuous and planar sensor surface such that the finger moving over said surface from one of the space-apart regions to another will touch said ridge of material; and
   (c) providing a plurality of cursor manipulation functions in a stored program in the computer which controls the display, said functions being actuable through contact by the finger with the touch-sensitive cursor manipulation device, wherein at least one of the plurality of cursor manipulation functions is only actuable by moving the finger from a first region to a second region of the plurality of spaced-apart regions.

2. The method as defined in claim 1 wherein the step of providing the plurality of cursor manipulation functions in the stored program in the computer includes providing a drag extend function which comprises the steps of:
   (a) manipulating the touch-sensitive device such that the finger is caused to select an object on the display with the cursor;
   (b) sliding the finger across the surface of the touchsensitive device from the first region to the second region, thereby causing a corresponding movement of the selected object across the display and activation of the drag extend function in the stored program;
   (c) lifting the finger off the surface, yet not deselecting the selected object;
   (d) placing the finger in contact with the surface within the first region;
   (e) sliding the finger across the surface; and
   (f) repeating steps (b) through (e) until the selected object is dragged to a desired location on the display.

3. The method as defined in claim 1 wherein the step of disposing on the generally planar sensor surface a plurality of spaced-apart regions on the touch-sensitive device further comprises the step of separating the first region from the second region by forming the ridge of material on a boundary between the first and second regions.

4. The method as defined in claim 3 wherein the step of disposing on the generally planar sensor surface a plurality of spaced-apart regions on the touch-sensitive device further comprises the steps of:
   (a) disposing the second region about a first perimeter of the generally planar surface of the touch-sensitive device; and
   (b) disposing the first region within the first perimeter of the generally planar surface so as not to overlap the second region.

5. The method as defined in claim 1 wherein the steps of disposing on the generally planar sensor surface a plurality of spaced-apart regions on the touch-sensitive device further comprises the step of disposing at least a third region on the touch-sensitive device so as to simulate a mouse button, said third region not overlapping the first or second regions.

6. The method as defined in claim 1 wherein the step of providing a touch-sensitive cursor manipulation device further comprises the step of providing a touchpad.

7. A method for providing human perceptible tactile differentiation to a human finger when using a continuous touch-sensitive cursor manipulation device of a computer controlled display, thereby enabling a user to manipulate a cursor on the display without viewing the cursor manipulation device and determining a location of the finger, the method comprising the steps of:

(a) providing the touch-sensitive cursor manipulation device having at least one generally continuous and planar sensor surface for contact and movement thereover of the finger;

(b) disposing on the generally continuous and planar sensor surface a plurality of spaced-apart textured regions in which the texture of each region is different from the texture of at least one other region; and (c) providing a plurality of cursor manipulation functions in a stored program in the computer which controls the display, said functions being actuable through contact by the finger with the touch-sensitive cursor manipulation device, wherein at least one of the plurality of cursor manipulation functions is only actuable by moving the finger from a first textured region to a second textured region of the plurality of spaced-apart textured regions.

8. The method as defined in claim 7 wherein the step of providing the plurality of cursor manipulation functions in the stored program in the computer includes providing a drag extend function which comprises the steps of:

(a) manipulating the touch-sensitive device such that the finger is caused to select an object on the display with the cursor;

(b) sliding the finger across the textured surface of the touch-sensitive device from a the first textured region to the second textured region, thereby causing a corresponding movement of the selected object across the display and activation of the drag extend function in the stored program;

(c) lifting the finger off the surface, yet not deselecting the selected object;

(d) placing the finger in contact with the surface within the first region;

(e) sliding the finger across the surface; and (f) repeating steps (b) through (e) until the selected object is dragged to a desired location on the display.

9. The method as defined in claim 7 wherein the step of disposing on the generally planar sensor surface a plurality of spaced-apart textured regions on the touch-sensitive device further comprises the steps of:

(a) disposing the second textured region about a first perimeter of the generally planar surface of the touch-sensitive device; and (b) disposing the first textured region within the first perimeter of the generally planar surface so as not to overlap the second textured region.

10. The method as define in claim 7 wherein the step of disposing a plurality of textured regions on the touch-sensitive input device comprises the more specific step of disposing thereon a first perceptibly textured region and a differently textured and humanly distinguishable second perceptibly textured region.

11. The method as defined in claim 10 wherein the steps of disposing on the generally planar sensor surface a plurality of spaced-apart textured regions on the touch-sensitive device further comprises the step of disposing at least a third textured region on the touch-sensitive device so as to simulate a mouse button, said third textured region not overlapping the first or second textured regions, and being differently textured and humanly distinguishable from the first and second textured regions.

12. The method as defined in claim 7 wherein the step of providing a touch-sensitive cursor manipulation device further comprises the step of providing a touchpad.

13. A system for providing human perceptible tactile differentiation to a human finger when using a touch-sensitive cursor manipulation device of a computer controlled display, said system comprising:

(a) sensing surface means for sensing contact by the human finger on the sensing surface means, said contact corresponding to a touch function sequence;

(b) a plurality of spaced-apart textured regions disposed on the sensing surface means, the texture of each region being different from the texture of at least one other region; and (c) a plurality of cursor manipulation functions stored in a memory of the computer which controls the display, said functions being actuable through contact by the finger with the sensing surface means, wherein at least one of the plurality of cursor manipulation functions is only actuable by moving the finger from a first textured region to a second textured region of the plurality of spaced-apart textured regions.

14. The system as defined in claim 13 wherein the sensing surface means is a touchpad.

15. A system for providing human perceptible tactile differentiation to a human finger when using a touch-sensitive cursor manipulation device of a computer controlled display, said system comprising:

(a) a sensing surface device including a generally continuous and planar surface for sensing contact by the human finger on the sensing surface device, said contact corresponding to a touch function sequence;

(b) a plurality of spaced-apart regions disposed on the generally continuous and planar sensing surface means, said regions being separated by a ridge of material which rises above the sensing surface device such that the finger moving over said sensing surface device and moving from one of the spaced-apart regions to another will touch said ridge of material; and (c) a plurality of cursor manipulation functions stored in a memory of the computer which controls the display, said functions being actuable through contact by the finger with the generally continuous and planar sensing surface device, wherein at least one of the plurality of cursor manipulation functions is only actuable by moving the finger from a first region to a second region of the plurality of spaced-apart regions.

16. The system as defined in claim 15 wherein the sensing surface means is a touchpad.

* * * * *